United States Patent [19]

Bauer et al.

[11] 3,963,520

[45] June 15, 1976

[54] PRIMARY CELL CORROSION INHIBITOR

[75] Inventors: Jakob Bauer, Ellwangen-Rotenbach; Albert Winkler, Ellwangen, both of Germany

[73] Assignee: Varta Batterie Aktiengesellschaft, Hannover, Germany

[22] Filed: Aug. 6, 1975

[21] Appl. No.: 602,394

[52] U.S. Cl. .................................. 136/107; 136/154
[51] Int. Cl.² .................................... H01M 6/06
[58] Field of Search ............. 136/107, 102, 30, 6 L, 136/125, 146, 154, 106

[56] References Cited
UNITED STATES PATENTS

| | | | |
|---|---|---|---|
| 3,095,331 | 6/1963 | Davis | 136/107 |
| 3,281,278 | 10/1966 | Schaefer | 136/107 |
| 3,291,645 | 12/1966 | Gould | 136/107 |
| 3,303,054 | 2/1967 | Gruber et al. | 136/107 |
| 3,877,993 | 4/1975 | Davis | 136/107 |
| 3,905,833 | 9/1975 | Louzos | 136/107 |

Primary Examiner—John H. Mack
Assistant Examiner—C. F. Lefevour
Attorney, Agent, or Firm—Weiser, Stapler & Spivak

[57] ABSTRACT

A corrosion inhibitor for primary cells of saturated or unsaturated monocarboxylic acid containing at least two ethanolamide radicals.

9 Claims, No Drawings

PRIMARY CELL CORROSION INHIBITOR

The invention relates to a primary cell which comprises a negative zinc electrode, a positive depolariser electrode and a corrosion inhibitor.

It is known that the electrical properties of primary cells are dependent upon external influences and are thus variable quantities. Their deterioration is caused by various physical and chemical processes, in which the ambient temperature plays a decisive part. The change caused by corrosion in the negative zinc electrode contributes considerably to the aging effect.

A temperature-dependent corrosion reaction occurs during storage, that is to say during the interval between the production date and the date at which the cell is used by the consumer, and also as a parasitic reaction during use (discharge). Hitherto, the parasitic reaction could be kept at a minimum only by amalgamation of the zinc. The usual degree of amalgamation in zinc amounts to from 8% to 15%.

Amalgamation of the zinc changes the anodic reaction properties of the zinc and also reduces the double layer capacity (T. P. Dirkse et al., Electrochem. Soc. 115, 442, 1968 and R. W. Powers et al., Electrochem. Soc. 116, 719, 1969). It results in a reduced overvoltage for the zinc-zincate reaction and an increase in the maximum permissable current density, except at temperatures close to 0°C.

Amalgamation also results in an increase in the hydrogen overvoltage proportional to the mercury concentration. The rate of corrosion at no load is reduced by the hydrogen overvoltage (T. P. Dirkse, Power Sources 2,411. 1968; Collins D. H., Proceedings of the 6th International Symposium, Brighton, September 1968).

The discharge capacity of amalgamated zinc is greater than that of non-amalgamated zinc (T. P. Dirkse, Power Sources 2, 1968).

It follows from the above that amalgamated zinc with a relatively high concentration of mercury has to be used. On the other hand, the use of mercury in the manufacturing process makes it necessary to take rigorous safety measures, since the amalgamation proceeds, for example, by treating the zinc in an acidic mercury-II-chloride solution. Mercury-II-chloride is highly toxic. The uncontrolled disposal of the spent batteries also constitutes a contributory factor to future environmental pollution which should not be disregarded.

It is an object of the invention to provide a primary cell in which the concentration of the mercury used is lower and is replaced by a non-toxic inhibitor.

In accordance with the invention, this problem is solved by providing the primary cell with a corrosion inhibitor in the form of a saturated or unsaturated monocarboxylic acid with at least two ethanolamide radicals.

Monocarboxylic acids containing more than 12 carbon atoms in the molecule, particularly those present in the form of -diethanolamides are preferably used. They may, however, also be present in the form of -polyethanolamides (-polyathylanolamid). It will be understood that mixtures of various monocarboxylic acid compounds may also be used.

Suitable saturated monocarboxylic acids include, for example, palmitic acid ($CH_3-(CH_2)_{14}-COOH$ and stearic acid $CH_3-(CH_2)_{16}-COOH$; suitable unsaturated monocarboxylic acids include, for example, linoleic acid $CH_3-(CH_2)_4-CH=CH-CH_2-CH=CH-(CH_2)_7-COOH$ and oleic acid $CH_3-(CH_2)_7-CH=CH-(CH_2)_7-COOH$.

Tests have shown that good results may be obtained by using oleic acid diethanolamide $C_{22}H_{43}O_3N$. Compounds of the aforementioned groups are suitable for use as inhibitors provided that they are soluble in or miscible with particularly water, the electrolyte or an organic solvent so that the introduction of the material into the element or cell may be facilitated.

Pulverulent or granular zinc conventionally used in the production of alkaline primary cells is usually amalgamated with from 8% to 15% of mercury based on the total quantity. Surprisingly, it has been found that the mercury content may be substantially reduced to less than 5% provided that one of the aforementioned substances considered to be suitable in accordance with the invention is added in an amount of from 0.005% to 1%, based on the weight of the zinc electrode. Amounts exceeding 1% result in an undesirable decrease in active zinc material. At concentrations of less than 0.005%, the activity suffers as will be shown in a subsequent example. Concentrations of from about 0.01% to about 0.3% are preferred.

The application of the inhibitor to the material of the zinc electrode may be brought about as follows.

The inhibitor is initially dissolved or dispersed in a solvent (for example water) and a predetermined quantity of the resulting solution or dispersion is then applied to the dried zinc powder amalgamated with from 3% to 5% of mercury. The solvent is then allowed to evaporate. The rate of evaporation is advantageously increased by drawing a vacuum or by introducing the treated material into a stream of dry air.

The inhibitor may also be incorporated in the separator, or it may be added to the electrolyte. In the latter case, the inhibitor deposits on the electrode.

Cells comprising this material as the negative electrode, a positive $MnO_2$ electrode and an alkaline electrolyte were produced. The Tables 1 and 2 forming part of this Specification show the test results and the discharge data obtained upon storage of button cells (IEC-LR9), in which the zinc electrode contained the conventional amount of mercury and button cells in which the zinc electrode contained an addition of the inhibitor hereinbefore described and a smaller amount of mercury, under normal conditions and under tropical conditions respectively.

The test carried out with a low mercury content and with an addition of the organic inhibitor showed surprisingly that the storage life remained unaffected. When light discharges, for example continuous discharges through 400 Ohms, were carried out, it was found after three months storage under normal conditions that the lower mercury concentration had resulted in improved performance. Upon storage at an elevated temperature, the values obtained with a lower mercury content corresponded substantially to the initial values, whereas high concentrations of mercury resulted in a distinctly reduced output performance.

Thus, the corrosive side reactions during storage were considerably reduced by the inhibitor so that zinc having a lower mercury content may be used resulting in improved discharge yields, particularly upon the application of light loads. In addition to all these advantages there is, moreover, the advantage that the organic inhibitor used is completely non-toxic.

It will be understood that this material may be used in round cells as well as in button cells. When the material is used in round cells, the anode is generally introduced in the form of a paste or in the form of a gel.

Incorporation of the inhibitor in the separator does not have any disadvantageous results.

TABLE 1

| Anode | Addition of inhibitor | Storage at normal temperatures (20°C). | | | | Discharge ($\bar{x}$) h | |
| --- | --- | --- | --- | --- | --- | --- | --- |
| | | Months | $U_o$(volts) | $U_o$(volts) 200Ω | Cell height (h) mm | 200 Ω | 400 Ω |
| Zinc with 8% Hg | no | 0 | 1.543 | 1.531 | 5.88 | 28.4 | 59.7 |
| | | 3 | 1.535 | 1.521 | 5.88 | 24.1=85% | 57.5=96% |
| Zinc with 4.5% Hg | yes | 0 | 1.539 | 1.529 | 5.87 | 26.1 | 59.7 |
| | | 3 | 1.533 | 1.517 | 5.88 | 23.6=90% | 60.2=101% |

TABLE 2

| | | Storage at 45°C and 50% relative humidity. | | | | | |
| --- | --- | --- | --- | --- | --- | --- | --- |
| Zinc with 8% Hg | no | 0 | 1.543 | 1.531 | 5.88 | 18.6=65% | 59.7 |
| | | 3 | 1.514 | 1.502 | 5.89 | | 51.6=86% |
| Zinc with 4.5% Hg | yes | 0 | 1.539 | 1.529 | 5.87 | | 59.7 |
| | | 3 | 1.515 | 1.500 | 5.87 | 18.4=65% | 59.5=100% |

We claim:

1. A primary cell comprising a negative amalgamated zinc electrode, a positive depolariser electrode and an alkaline electrolyte, a corrosion inhibitor of monocarboxylic acid selected from the group consisting of saturated and unsaturated monocarboxylic acids each having at least two ethanolamide radicals, said inhibitor being present in an amount not exceeding 1 percent based on the weight of the zinc electrode.

2. The cell of claim 1, wherein the monocarboxylic acid contains more than 12 carbon atoms in the molecule.

3. The cell of claim 1 wherein the inhibitor is present in a concentration of from 0.005% to 1.0% based on the total weight of the zinc electrode.

4. The cell of claim 3 wherein the inhibitor is present in a concentration of from about 0.01% to about 0.3% based on the total weight of the zinc electrode.

5. The cell of claim 1 wherein the inhibitor is the diethanolamide of oleic acid.

6. The cell of claim 1 wherein the inhibitor is added to the zinc electrode.

7. The cell of claim 1 wherein the separator is impregnated with the inhibitor.

8. The cell of claim 1 wherein the inhibitor is added to the electrolyte.

9. The cell of claim 1 wherein the cell also includes mercury amalgamated with the zinc in proportions of less than about 5% mercury based on the weight of the zinc electrode.

* * * * *